United States Patent
Dehais et al.

(10) Patent No.: US 10,208,876 B2
(45) Date of Patent: Feb. 19, 2019

(54) METHOD FOR MOUNTING AN ENDPIECE FOR SECURING A FLEXIBLE TUBULAR PIPE AND APPARATUS FOR IMPLEMENTING SAME

(71) Applicant: TECHNIP FRANCE, Courbevoie (FR)

(72) Inventors: Romuald Dehais, Saint-Arnoult (FR); Grégory Peckeu, Bourg-Achard (FR)

(73) Assignee: TECHNIP FRANCE (FR)

( * ) Notice: Subject to any disclaimer, the term of this patent is extended or adjusted under 35 U.S.C. 154(b) by 347 days.

(21) Appl. No.: 15/108,218

(22) PCT Filed: Dec. 22, 2014

(86) PCT No.: PCT/FR2014/053522
§ 371 (c)(1),
(2) Date: Jun. 24, 2016

(87) PCT Pub. No.: WO2015/101740
PCT Pub. Date: Jul. 9, 2015

(65) Prior Publication Data
US 2016/0319972 A1    Nov. 3, 2016

(30) Foreign Application Priority Data
Dec. 30, 2013 (FR) ...................................... 13 63719

(51) Int. Cl.
*B23Q 9/00* (2006.01)
*B25B 27/10* (2006.01)
*F16L 33/01* (2006.01)

(52) U.S. Cl.
CPC .............. *F16L 33/01* (2013.01); *B25B 27/10* (2013.01); *B23Q 9/0007* (2013.01);
(Continued)

(58) Field of Classification Search
CPC ............. Y10T 29/5185; Y10T 29/5199; Y10T 29/53652; B23Q 9/0007; B23Q 9/0014;
(Continued)

(56) References Cited

U.S. PATENT DOCUMENTS 2,537,916 A    1/1951  Rosenboom
5,189,933 A    3/1993  Ricci
(Continued)

FOREIGN PATENT DOCUMENTS

FR    2 760 813 A1    9/1998
FR    2 816 389 A1    5/2002
(Continued)

OTHER PUBLICATIONS

International Search Report dated Mar. 23, 2015 issued in corresponding International patent application No. PCT/FR2014/053522.

*Primary Examiner* — Jason L Vaughan
(74) *Attorney, Agent, or Firm* — Ostrolenk Faber LLP

(57) ABSTRACT

A method for mounting an endpiece for securing a tubular pipe and apparatus for implementing same. The method includes the steps of: a) providing an endpiece and a ring (36') having an outer rotationally symmetrical cylindrical surface (40'), and a sheath having a sheath end (32) and an outer circular edge (46'); b) inserting the ring (36') into the sheath end (32); c) leveling off the outer circular edge (46'); and d) covering the leveled edge with the endpiece. In step b) the ring (36, 36', 36") is inserted leaving one of the ends (44') thereof extending out of the sheath end (32), and in step c) the outer circular edge (46') is leveled off, by engaging the one of the two ring ends (44').

14 Claims, 5 Drawing Sheets

(52) U.S. Cl.
CPC .......... *B23Q 9/0014* (2013.01); *B23Q 9/0021* (2013.01); *B23Q 9/0042* (2013.01); *B23Q 9/0057* (2013.01); *Y10T 29/5185* (2015.01); *Y10T 29/5199* (2015.01); *Y10T 29/53652* (2015.01)

(58) Field of Classification Search
CPC .... B23Q 9/0021; B23Q 9/0042; B23Q 9/005; B23Q 9/0057; B23B 3/26; B23B 3/265
See application file for complete search history.

(56) References Cited

U.S. PATENT DOCUMENTS

| | | | | |
|---|---|---|---|---|
| 6,220,303 | B1* | 4/2001 | Secher | E21B 17/017 138/109 |
| 6,923,477 | B2* | 8/2005 | Buon | F16L 33/003 138/109 |
| 8,079,619 | B2* | 12/2011 | Witz | F16L 33/01 285/249 |
| 9,868,164 | B2* | 1/2018 | Makkonen | B23C 1/20 |

FOREIGN PATENT DOCUMENTS

| | | |
|---|---|---|
| WO | WO 2004/079248 A1 | 9/2004 |
| WO | WO 2012/045912 A1 | 4/2012 |

\* cited by examiner

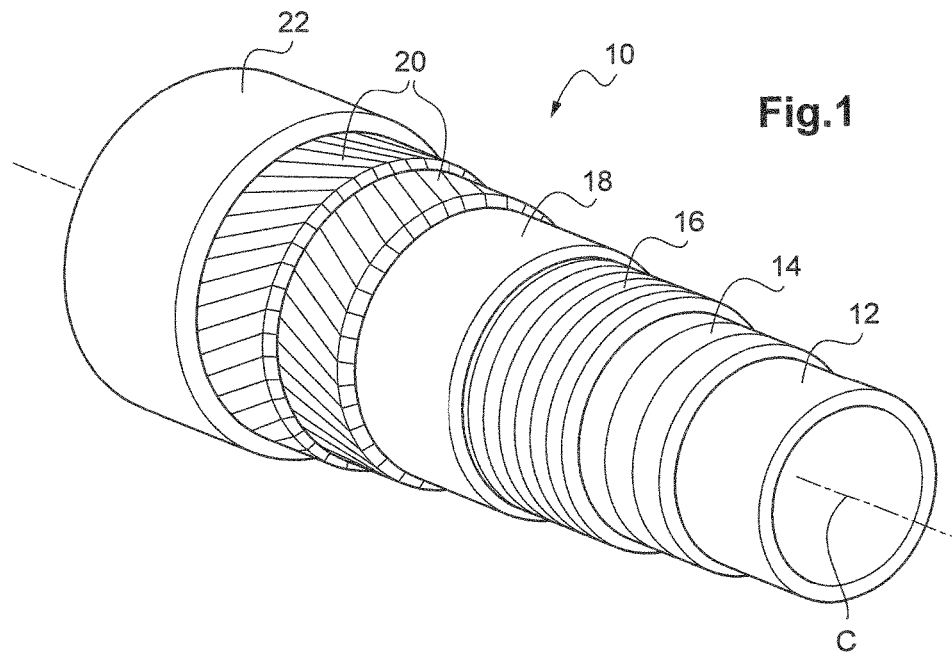
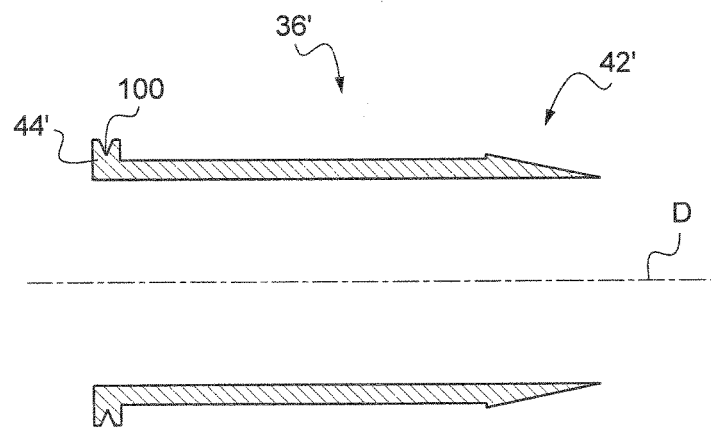
Fig.6

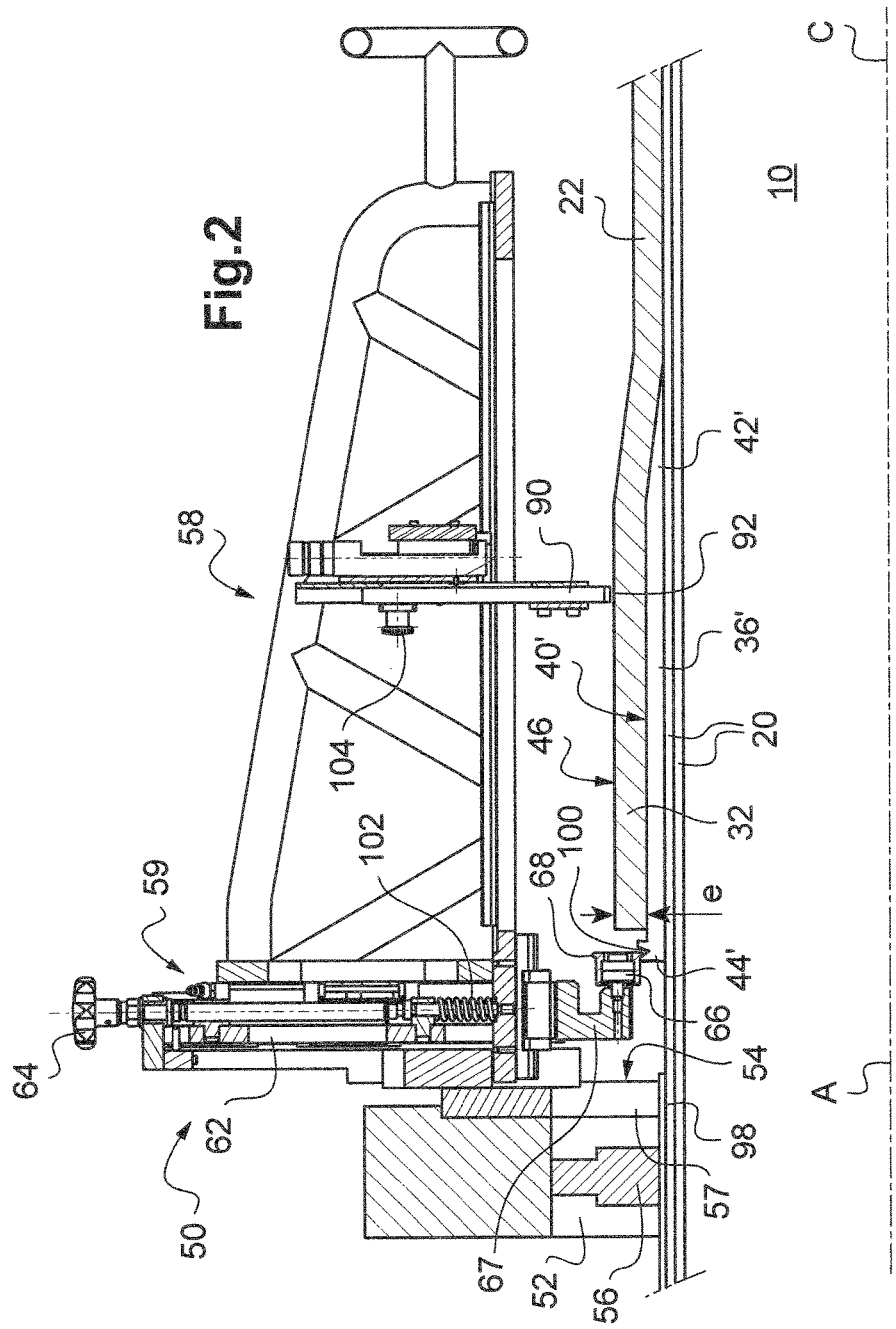

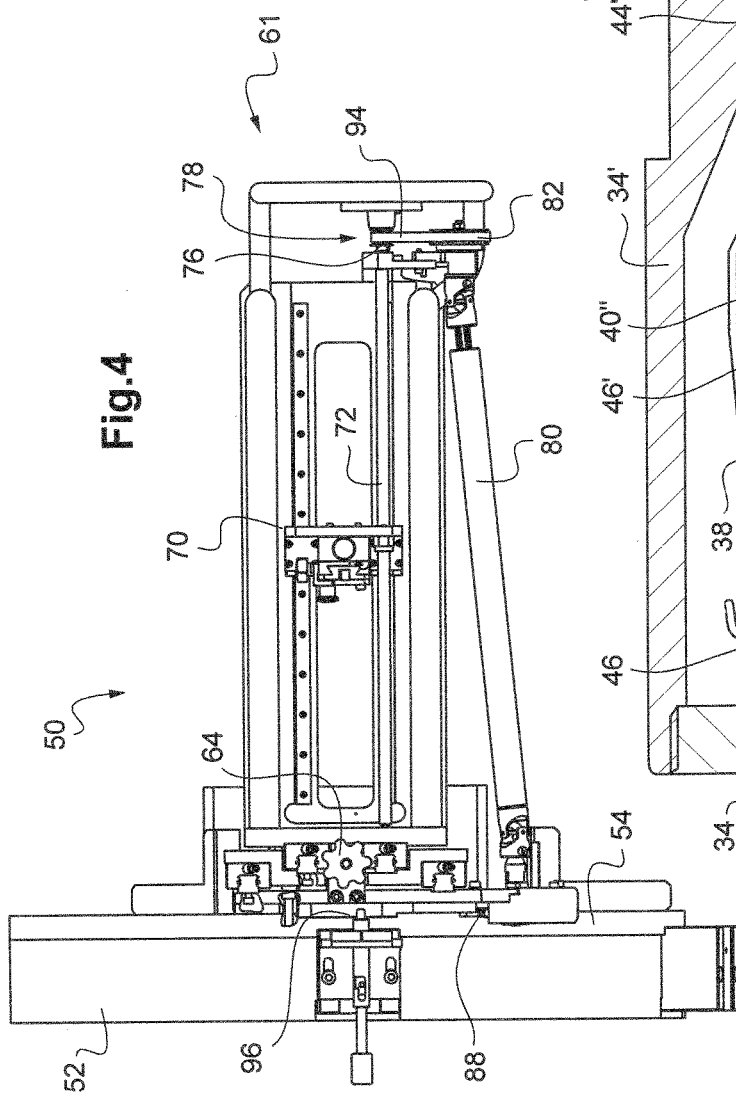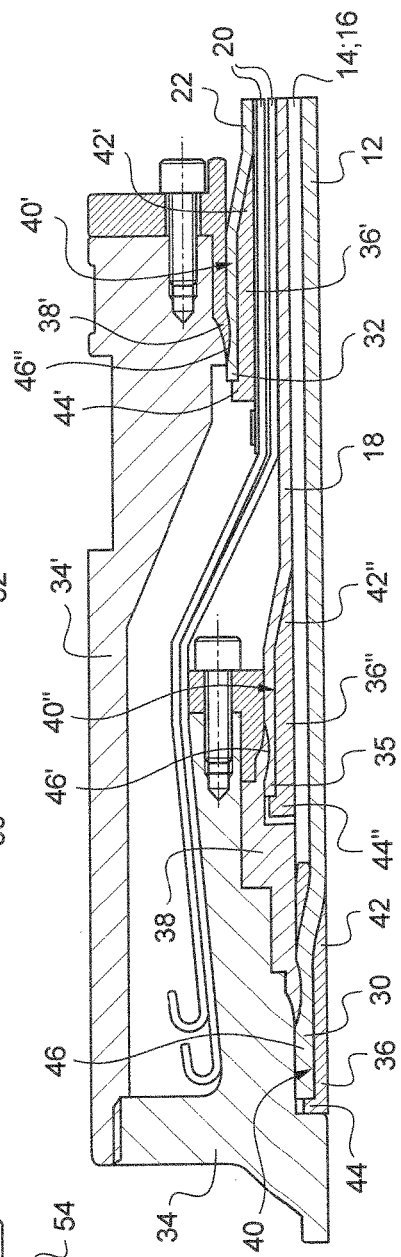

METHOD FOR MOUNTING AN ENDPIECE FOR SECURING A FLEXIBLE TUBULAR PIPE AND APPARATUS FOR IMPLEMENTING SAME

CROSS-REFERENCE TO RELATED APPLICATIONS

The present application is a 35 U.S.C. §§ 371 national phase conversion of PCT/FR2014/053522, filed Dec. 22, 2014, which claims priority of French Patent Application No. 1363719, filed Dec. 30, 2013, the contents of which are incorporated by reference herein. The PCT International Application was published in the French language The present invention relates to a method for mounting a securing end fitting for a flexible tubular pipe, and to an installation intended to implement such a mounting method.

"Unbonded" flexible tubular pipes, described in the normative documents API 17J, "Specification for Unbonded Flexible Pipe" and API RP 17B, "Recommended Practice for Flexible Pipe" published by the American Petroleum Institute, comprise a plurality of superposed layers of metal materials and plastics materials, giving them their mechanical properties and their sealing properties with respect to the hydrocarbon that they transport and to the surrounding environment.

In addition, they generally comprise, from the inside to the outside, a metal carcass made of an interlocked spiral metal strip, a pressure sheath made of polymer material, a helical winding at a short pitch of a metal wire forming a pressure vault, at least one metal tensile armor ply wound at a long pitch around said pressure vault, and an external protective sheath made of polymer material. These pipes can also have, in some cases, an intermediate sheath made of polymer material.

These pipes are thus sealed, and securing end fittings that are likewise sealed should be mounted at their ends. This has to be the case between the end fitting and the pressure sheath, inside which the hydrocarbon flows. When the pipe has an intermediate sheath, the latter thus has to be connected to the end fitting in a sealed manner. The sealing of the external sheath is less important than that of the pressure sheath and of the intermediate sheath, since most flexible pipes are designed to durably withstand a loss of sealing of the external sheath. However, it is preferable for the external sheath to also be sealed and connected to the end fitting in a sealed manner, notably when the pipe is intended for an underwater application, so as to avoid seawater passing through the wall of the pipe and corroding the metal armor.

The end of each sheath is connected to the end fitting by virtue of a cold crimping method, which consists of radially compressing the wall of the sheath between two metal parts pressed against the internal and external faces of the sheath. The metal part pressed against the internal face of the sheath generally consists of a cannula formed by a ring. The cannula is fitted into the end of the sheath, in direct contact with the internal face of the latter and around any layers situated inside the latter. The end fitting then covers the end of the pipe and annular wedging elements are then pressed against the external face of the end of the sheath opposite the cannula, and then these annular wedging elements are driven and held by force between the body of the end fitting and the cannula, compressing the thickness of the sheath in order to ensure sealing.

The sealing of the connection depends on the intensity and homogeneity of this annular compression of the end of the sheath.

In addition, in order that the sealing of the connection is satisfactory, it is necessary to make sure that a constant and homogeneous sheath thickness is obtained at the end inside which the cannula is fitted. This is because, as a result of their manufacturing process, extruded sheaths have mediocre dimensional tolerances, in particular as far as their thickness is concerned. Thus, for example, the difference between the maximum and minimum thicknesses of the sheath in the crimping zone can be greater than three millimeters, this being excessive for ensuring the quality of crimping. In order to remedy this problem, once the cannula has been fitted, the thickness of the sheath is measured in the entire zone surrounding the cannula, in order to determine the position and the amplitude of the thickness extremes. These thickness measurements are generally carried out by ultrasound. Next, the external edge of the end of the sheath is leveled off with the aid of a hand tool of the file or sander type, so as to reduce the thickness of the sheath in the zones having a maximum thickness. The measuring and leveling steps need to be repeated several times until the thickness of the sheath is substantially constant, around five-tenths of a millimeter, in the zone surrounding the cannula.

Not only is such a method poorly reproducible, it is also extremely lengthy, tiresome and expensive. Moreover, it requires a very experienced operator, because otherwise there is a risk of a lack of sealing at the end fitting.

SUMMARY OF THE INVENTION

Thus, one problem that is addressed by and intended to be solved by the present invention is that of providing a method which makes it possible to obtain better sealing of the securing end fittings for flexible tubular pipes.

To this end, and according to a first subject, the present invention proposes a method for mounting a securing end fitting for a flexible tubular pipe, said method being of the type comprising the following steps of: a) providing an end fitting and a ring having an external surface in the form of a cylinder of revolution and two opposite cylindrical ends, for the one part, and a sheath having a sheath end and an external circular edge situated at said sheath end, for the other part; first of all, b) said ring is fitted inside said sheath end; then, c) said external circular edge is leveled off to form a leveled edge that has cylindrical symmetry of revolution and is substantially coaxial with said external cylindrical surface; and d) said leveled edge is covered with said end fitting so that said sheath end can be crimped between said ring and said end fitting. In step b), said ring is fitted with one of said two ends being allowed to extend out of said sheath end, and in step c), said external edge is leveled off at a given radial distance from said external cylindrical surface by using said one of said two ring ends as a support.

Thus, one feature of the method according to the invention resides in the machining of the external edge of the plastics sheath corresponding to the zone in which the ring, or cannula, is inserted, using this ring precisely as a support. For this purpose, it is necessary for one of these ends to protrude substantially freely from the end of the sheath. This is because, inside the ring, other layers of the pipe extend, for example the carcass for an internal pressure sheath, or all the other layers of the pipe for an external sheath. In this way, using the protruding end of the ring as a support makes it easy to find a reference for determining the thickness of the sheath which extends around the external surface, in the form of a cylinder of revolution, of the ring.

Finding a reference with respect to the inside of the pipe would obviously also have been possible. However, the internal surface of the pipe is not necessarily symmetrically circular or perfectly regular. In addition, it is not necessarily coaxial with the external surface, in the form of a cylinder of revolution, of the ring. Moreover, the external edge of the sheath that has to be leveled off can be relatively far away from the end of the pipe, for example more than 1 meter in the case of an external sheath, and in addition, the flexible pipe is not necessarily perfectly rectilinear between its end and the zone to be leveled off. In addition, a machine tool centered with respect to the inside of the end of the pipe would not make it possible to machine the external circular edge of the sheath so as to obtain a constant sheath thickness at its end inside which the ring is inserted.

In a particularly advantageous embodiment of the invention, in step c), the actual machining step, a cutting tool is provided and said cutting tool is held against said external circular edge at said given radial distance from said external cylindrical surface, while said cutting tool is driven in rotation about said ring. Thus, the relative position of the cutting tool and the external surface, in the form of a cylinder of revolution, of the ring is adjusted and is kept constant in a radial direction, while the cutting tool is driven in rotation, with the end of the ring extended out of the sheath end continuing to be used as a support. In this way, by virtue of the cutting tool, the material of the sheath is machined at the external circular edge so as to substantially reduce its thickness in order to make it uniform around the entire circumference of the external circular edge.

Advantageously, said cutting tool is also driven in translational movement in the axial direction of said ring. In this way, the entire surface defined by the cylindrical external circular edge is machined to the same dimension. Thus, the sheath thickness becomes constant at the circular edge. On this basis, it is easy to uniformly compress the sheath end coaxially between the ring and the end fitting in order to obtain perfect sealing.

Preferably, said cutting tool is driven in translational movement with a given stroke amplitude for each turn of said cutting tool. Thus, by driving the cutting tool in translational movement at a pitch corresponding to the amplitude for each turn, the cylindrical surface corresponding to the external circular edge is machined uniformly.

According to a particularly advantageous feature of the invention, a ring having a guide groove on said one of said two ring ends is provided. In this way, and as will be explained in more detail below, it is easier to guide the support point on the ring end. Moreover, a ring of which said one of said two ring ends has a bearing collar is preferably provided. Thus, the ring is locally reinforced, allowing it to ensure complete rigidity when it is used for support. Of course, the support surface formed by the collar has cylindrical symmetry of revolution and is coaxial with the cylindrical surface of the ring. Advantageously, a ring having said guide groove provided in said bearing collar is provided.

According to another subject, the present invention relates to a ring for implementing the method described above, said ring comprising two opposite cylindrical ends, and in that one of said two ends has a collar and a radial groove provided in said collar.

According to yet another subject, the present invention proposes an installation for mounting a securing end fitting for a flexible tubular pipe, said flexible tubular pipe comprising a sheath having a sheath end and an external circular edge situated at said sheath end, for the one part, and a ring having an external surface in the form of a cylinder of revolution and two opposite cylindrical ends, for the other part, said ring being fitted inside said sheath end with one of said two ends being allowed to extend out of said sheath end. The installation comprises a cutting tool, for the one part, and a bearing member that is able to use said one of said ring ends as a support in order to hold said cutting tool against said external edge at a given radial distance from said external cylindrical surface, for the other part; and said cutting tool is intended to be driven in rotation about said ring so as to level off said external edge in order to form a leveled edge that has cylindrical symmetry of revolution and is substantially coaxial with said external cylindrical surface.

According to a particularly advantageous feature of the invention, the installation comprises a drive wheel having an axis of symmetry and a peripheral edge, for the one part, and a support arm that is mounted on said peripheral edge and extends substantially parallel to said axis of symmetry, for the other part, and said bearing member and said cutting tool are mounted on said support arm. Thus, the drive wheel is fitted opposite the end of the sheath equipped with its ring such that its axis of symmetry is coincident with the axis of the flexible tubular pipe. On this basis, the support arm is able to extend parallel to the axis of the sheath and opposite its external circular edge. Moreover, it extends in line with the cylindrical end of the ring extended freely out of the sheath end. On this basis, the cutting tool mounted on the support arm can come into contact with the external edge of the sheath, while the bearing member can use the free cylindrical end of the ring as a support.

In addition, said support arm is mounted so as to be able to move in translation on said drive wheel in a radial direction. Such a feature makes it possible to compensate for the lack of coaxiality of the drive wheel with the external surface, in the form of a cylinder of revolution, of the ring. Moreover, the installation comprises elastic members for forcing said support arm toward the center of said drive wheel. In this way, during the rotation of the drive wheel and of the support arm, the bearing member remains in permanent contact with the free cylindrical end of the ring.

Advantageously, said cutting tool is mounted so as to be able to move in translation on said support arm in a direction parallel to said axis of symmetry, so as to be able to machine the entire surface of the external circular edge of the sheath. The means of connection between the cutting tool and the support arm, and especially the means of controlling the driving in translational movement of the cutting tool, will be explained in more detail subsequently in the description.

According to a preferred feature of the invention, said bearing member has a roller that has an axis of rotation substantially parallel to said axis of symmetry. The roller thus rolls on the end of the ring extended out of the sheath end when the support arm is driven in rotation about the external circular edge. The ring end thus forms a circular rolling track. Such rolling support makes it possible to reduce friction between the bearing member and the ring end, making it possible to reduce the forces required for driving the support arm in rotation.

In addition, and in a particularly advantageous manner, the installation comprises a holder that is able to hold said wheel, said holder being intended to hold said wheel and said flexible tubular pipe substantially coaxially. Thus, the drive wheel is mounted in a rotatable manner on the holder, which is advantageously itself circular. The description of the features of the holder will be described more precisely subsequently in the description.

Further particular features and advantages of the invention will become apparent from reading the following description of a particular embodiment of the invention, given by way of nonlimiting indication, with reference to the appended drawings, in which:

BRIEF DESCRIPTION OF THE DRAWINGS

FIG. 1 is a partial schematic cutaway view of a flexible tubular pipe;

FIG. 2 is a schematic view in axial section partially showing elements of the flexible tubular pipe and an installation in accordance with the invention;

FIG. 4 is a schematic elevation view of the installation shown in FIG. 3;

FIG. 5 is a schematic view in semi-axial section of a securing end fitting for a flexible tubular pipe;

FIG. 6 is a schematic detail view of FIG. 5; and

DESCRIPTION OF EMBODIMENTS

Figure 3:
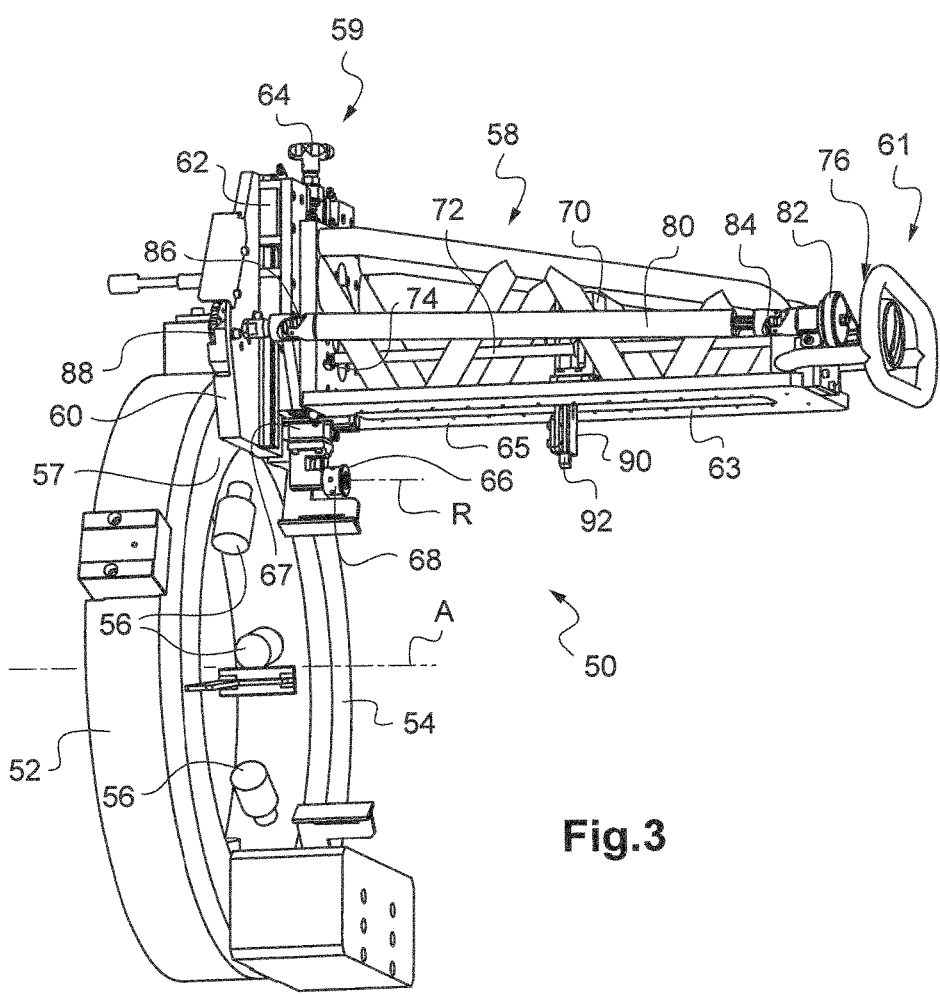
FIG. 3 is a perspective schematic view showing part of the installation shown in FIG. 2.

FIG. 1 illustrates a cutaway view of a flexible tubular pipe 10, having a pipe axis C. It has various superposed layers which form the pipe and these are provided successively one on another, from the inside of the pipe to the outside. The inside forms an internal flow space for the hydrocarbon.

Thus, the flexible tubular pipe 10 comprises, from the inside to the outside, an internal sealing sheath made of polymer material 12, a metal vault 14 formed by the helical winding at a short pitch of at least one metal wire in the form for example of a self-interlocked zeta wire, if necessary a hoop reinforcement 16 formed by a winding at short pitch of a rectangular wire, an anti-collapse intermediate wire 18, armor 20 resistant to axial tension in the longitudinal direction of the pipe and foamed by a pair of crossed armor plies wound at a long pitch in opposite directions, and an external sealing sheath made of polymer material 22. The internal sealing sheath 12 is also referred to as pressure sheath. The external sealing sheath 22 is also referred to as external sheath. The metal vault 14 and the hoop reinforcement 16 form the pressure vault 14, 16 of the pipe 10. The main function of the pressure vault 14, 16 is to react to the forces associated with the pressure of the fluid flowing through the pipe 10.

The pipe 10 shown in FIG. 1 is referred to as a smooth bore pipe since its first layer starting from the inside is a polymeric tube having a smooth internal surface. This type of pipe has an anti-collapse intermediate sheath 18 so as to protect the internal sheath 12 in the event of a loss of sealing of the external sheath 22. Specifically, when the pipe 10 is submerged, an accidental loss of sealing of the external sheath 22 causes flooding of the inside of the wall of the pipe. In this case, the seawater is stopped by the sealed intermediate sheath 18, the latter being able to react to the hydrostatic pressure since it is supported by the pressure vault 14, 16. In this way, the hydrostatic pressure is not applied to the external face of the pressure sheath 12 and does not cause this sheath to collapse.

The invention could also apply to pipes referred to as rough bore pipes. These pipes have a metal carcass situated inside the pressure sheath 12. This carcass generally consists of a profiled and interlocked spiral metal strip, its main function being to react the forces associated with the hydrostatic pressure.

The flexible pipes of the abovementioned type should be connected in a sealed manner at their ends.

Reference is made to FIG. 5, which illustrates in semi-axial section the end of the equipped pipe 10 having, at the front, one end 30 of the pressure sheath 12, and at the rear, one end 32 of the external sealing sheath 22. The pressure sheath end 30 is fitted inside a securing end fitting 34, while a first ring 36, or cannula, is itself fitted inside the pressure sheath end 30. The pressure sheath end 30 is crimped between the end fitting 34 and the first ring 36 by means of a tiered biconical annular part 38.

The first ring, or cannula, 36, has a first external surface in the form of a cylinder of revolution 40, and a first chamfered internal end 42 away from a first external end 44 forming a first collar.

The external sealing sheath end 32 is for its part fitted inside the end of the cylindrical cover 34', while a second ring, or cannula, 36', is fitted inside the sealing sheath end 32. The sealing sheath end 32 is crimped between the end of the cylindrical cover 34' and the second ring 36' by means of a monocone annular part 38'. The second ring, or cannula, 36' has a second external surface in the form of a cylinder of revolution 40', and a second chamfered internal end 42' away from a second external end 44' forming a second collar.

The intermediate sheath 18 has an intermediate sheath end 35 which is fitted inside the securing end fitting 34, while a third ring or cannula 36" is fitted inside the end 35 of the intermediate sheath. The end of the intermediate sheath 35 is crimped between the securing end fitting 34 and the third ring 36" by means of the tiered biconical annular part 38. The third ring or cannula 36" has a third external surface in the form of a cylinder of revolution 40", and a third chamfered internal end 42" away from a third external end 44" forming a third collar.

The quality of the seal between the end fitting 34 and the pressure sheath end 30 or between the cylindrical cover 34' and the sheath end 32, or between the end fitting 34 and the intermediate sheath end 35, depends respectively on the regularity of the thickness of the sheath end engaged between the first ring 36 and the sleeve 34, for the pressure sheath end 30, between the second ring 36' and the end of the cylindrical cover 34', for the external sheath end 32, and between the third ring 36" and the sleeve 34 for the intermediate sheath end 35.

In addition, it is essential to equalize the respective thicknesses of these three sheath ends, since of course, considering the embodiment of the sheaths, the thickness thereof is not constant.

Reference is made to FIG. 2, which illustrates part of the flexible tubular pipe with some of its elements omitted, more specifically the second ring, or cannula, 36' fitted inside the external sealing sheath end 32. The latter defines a free external circular edge 46 corresponding to a portion in which the second ring 36' is fitted. Moreover, a guide groove, which will be described below, is provided in the collar 44' and opens out radially away from the inside of the pipe.

In addition, the external circular edge 46 will then be leveled off by means of an installation 50 which will first be described in detail with reference to FIGS. 3 and 4.

Reference is first of all made to FIG. 3, which shows the mounting installation 50 according to the invention. It has a circular holder 52 and a drive wheel 54 mounted in a rotary manner on the circular holder 52, about an axis of symmetry A. The drive wheel 54 is driven in rotation with respect to the circular holder 52 by means of an electric motor (not shown). The circular holder 52 is equipped, on the inside, with cylinders 56 extending radially toward the center and making it possible to engage a cylindrical element which will itself already be engaged with the flexible tubular pipe, or with a hub of the pipe as will be explained below.

The drive wheel 54 defines a peripheral edge 57 and the installation 50 comprises a support arm 58 which is installed on the peripheral edge 56 and extends parallel to the axis of symmetry A of the drive wheel 54 between a connecting end 59 and a free end 61. The support arm 58 and the drive wheel 54 are connected together by means of a mounting plate 60 mounted in a fixed position on the drive wheel 54. The mounting plate 60 is equipped with slideways 62 and the connecting end 59 of the support arm 58 is mounted so as to slide in the slideways 62 in a radial direction. It is nevertheless held substantially perpendicularly to the mounting plate 60. Moreover, it is connected there to an adjusting member 64 that is equipped with elastic means and makes it possible to adjust the radial position of the support arm 58 with respect to the mounting plate 60.

In addition, the support arm 58 has a guide table 65 extending longitudinally from the connecting end 59 to the free end 61 and parallel to the axis of symmetry A of the drive wheel 54. An oblong slot 63 is made longitudinally in the guide table 65.

Furthermore, the support arm 58 is equipped with a guide roller 66 which protrudes from the guide table 65 in the direction of the axis of symmetry A of the drive wheel 54. The guide roller 66 has a support base 67 mounted so as to slide under the guide table 65 in a direction parallel to the axis of symmetry A of the drive wheel 54 between a position close to the mounting plate 60 and a position away from the mounting plate 60. The axis of rotation R of the guide roller 66 extends substantially parallel to the axis of symmetry A. In addition, the guide roller 66 has a flange 68 at its end.

The support arm 58 is provided, on the inside, with a carriage 70 that is able to move in translation in a direction parallel to the axis of symmetry A of the drive wheel 54 between the connecting end 59 and the free end 61 of the support arm 58. Moreover, the carriage 70 has an internal thread through which a threaded rod 72 passes, said threaded rod for its part also extending through the support arm 58 parallel to the axis of symmetry A. The threaded rod 72 has a first end 74 mounted so as to rotate in a first bearing at the connecting end 59 of the support arm 58, and a second end 76 equipped with a small wheel 78 illustrated in the single FIG. 4.

Returning to FIG. 3, it can be seen that the small wheel 78 is rotationally coupled to a transmission shaft 80 by means of a large wheel 82. The transmission shaft 80 is itself coupled, at one of its ends, to the large wheel 82 by means of a first universal joint 84, and at the other of its ends, by means of a second universal joint 86, to an incrementing wheel 88 installed on the mounting plate 60, and consequently offset from the slideways 62. It will be seen that the incrementing wheel 88 is installed substantially vertically above the drive wheel 54. Moreover, the transmission shaft 80 has two parts that are fitted one inside the other and are mounted so as to slide such that the two universal joints 84 and 86 can be driven in translational movement with respect to one another while retaining their properties.

Furthermore, the movable carriage 70 is equipped with a tool holder 90 which protrudes radially from the guide table 65 through the oblong cutout 63, toward the axis of symmetry A of the drive wheel 54, said tool holder 90 being provided with a cutting tool 92. The cutting tool 92 has a cutting edge substantially parallel to the axis of symmetry A.

The tool holder 90 is equipped with an adjusting member (not shown in FIG. 3) which makes it possible to radially adjust the relative position of the cutting tool 92 with respect to the guide roller 66.

Referring once again to FIG. 4, which illustrates in elevation the mounting installation 50 in a top view compared with its depiction in FIG. 3. The offset transmission shaft 80, the movable carriage 70 through which the endless screw 72 passes, the coupling of the transmission shaft 80 and of the endless screw 72 by virtue of the small wheel 78 and the large wheel 76 and via a transmission belt 94 can be seen therein.

It is also possible in this figure to see the circular holder 52 on which an incrementing finger 96 is installed at the periphery and is able to cooperate with the incrementing wheel 88 in order to cause it to rotate through a fraction of a turn, as will be explained in more detail subsequently in the description. It will be seen that the incrementing finger 96 is able to move between an active, protruding position and an inactive, retracted position, and that it is able to be held in a fixed position in one or the other of these positions.

Before referring once again to FIG. 2, in order to describe the operation of the installation 50 for machining the external circular edge 46, the ring, or cannula 36', will be described in more detail in FIG. 6. It is shown here in axial section, and its two opposite cylindrical ends, a chamfered internal end 42' and an external end 44' forming a collar, can be seen. The chamfered end 42' is internal since it engages inside the sheath end, while the end forming a collar is referred to as external since it protrudes out of the sheath end. By virtue of the chamfer, the chamfered end 42' is easier to fit inside the sheath end.

Moreover, as indicated above, the external end 44' forming a collar has a guide groove 100 for receiving the guide roller 66, as will be explained below. The guide groove 100 is in this case V-shaped so as not to allow any axial play, as will be explained below. Further guide groove profiles are conceivable, in shape cooperation with the profile of the guide roller 66, so as to prevent axial play.

Thus, as shown in FIG. 2, the circular holder 52 is first of all held in a fixed position with respect to the end of the external sealing sheath 22 by way of the hub of the pipe, for example encased in a protective layer 98. The hub of the pipe includes the extension of the underlying layers.

By virtue of the centering cylinders 56, the relative position of the drive wheel 54 and of the pipe are adjusted such that the axis of symmetry A of the drive wheel 54 is substantially coincident with the axis D of the ring 36'. Such an ideal position is not easy to obtain, notably because the external face of the hub of the pipe against which the cylinders 56 bear can be highly ovalized. On the other hand, it is relatively easy to obtain parallelism between the axis of symmetry A of the drive wheel 54 and the axis D of the ring 36'. Specifically, by design, the collar 44' has a flat side face perpendicular to the axis C. In addition, by design, the axes of the cylinders 56 are coplanar and perpendicular to the axis of the drive wheel 54. Consequently, in order to adjust the parallelism between the axes A and C, all that is necessary is to adjust the parallelism between the lateral plane of the collar 44', for the one part, and the plane containing the axes of the cylinders 56, for the other part, this being easily done by wedging. In practice, just before the cylinders 56 are clamped, three wedges of identical length are disposed in abutment against the flat side face of the collar 44', parallel to the axis C, along three different generatrices of the ring 36' (preferably three generatrices at 120°). Next, the circular holder 52 is moved until three of the cylinders 56 come into lateral abutment against these three wedges. Once this position has been obtained, the cylinders 56 are clamped and the wedges can be removed.

Such adjustment makes it possible to obtain good parallelism between the axes A and C. However, it does not make it possible to easily control and minimize the distance between the axes A and C. In practice, once this adjustment has been carried out, the drive wheel 54 can be off-center with respect to the ring 36' by several millimeters, typically between 5 mm and 10 mm. However, the installation 50 makes it possible to completely overcome this lack of coaxiality by virtue of the slideways 62, as will be explained.

In this situation, the support arm 58 extends parallel to the axis of the pipe C. The guide roller 66 and more specifically its flange 68 will then be adjusted inside the guide groove 100. It will be seen that the positioning of the flange 68 inside the guide groove 100 is facilitated by the fact that the support base 67 of the guide roller 66 is mounted so as to slide with respect to the drive wheel 54 along an axis parallel to the axis of symmetry A of the drive wheel 54. It is thus easy to move the guide roller 66 parallel to the axis A in order to find a position in which the flange 68 is situated next to the guide groove 100.

It will also be seen that the adjusting member 64 makes it possible to vary the radial distance between the guide roller 66 and the axis of symmetry A, thereby making it possible to radially space apart the guide roller 66 during this preliminary adjustment. Once the flange 68 is situated next to the guide groove 100, the adjusting member 64 makes it possible to drive the guide roller 66 radially in abutment in the guide groove 100. Moreover, as can be seen in this FIG. 2, the elastic means 102 described above make it possible to hold the guide roller 66 against the collar 44' by force.

Next, the tool holder 90 is manually adjusted into a position close to the guide roller 66 by driving the threaded rod 72, which does not appear in this figure, in rotation. Thus, the radial position of the tool holder 90 with respect to the adjusting member 104 defined above is adjusted such that the cutting tool 92 is pressed against the free external circular edge 46 of the sealing sheath end 32. It will be seen that the relative position in a radial direction of the guide roller 66 and of the cutting tool 92 will thus determine the thickness e of the sealing sheath end 32 during machining.

The drive wheel 54 is then driven in rotation by means of the electric motor, and on this basis, the arm 58 is itself driven in rotation about the external circular edge 46. As a result, the cutting tool 92 levels off the external circular edge 46, around its circumference, forming a shaving.

The cutting tool 92 is held at a given distance from the external surface in the form of a cylinder of revolution 40' by virtue of the guide roller 66, the flange 68 of which is held radially in the groove 100. The lack of coaxiality is thus compensated by virtue of the elastic means 102 and of the slideways 62 inside which the connecting end 59 of the support arm 58 can oscillate in translational movement during the rotation of the support arm 58.

Thus, on each turn, the guide roller 66 remains in contact with the collar 44' of the ring 36', while the connecting end 59 is driven in alternate translational movement in the slideways 62 with a period.

Moreover, on each turn of the drive wheel 54, the incrementing wheel 88 is engaged with the incrementing finger 96, these being illustrated in FIG. 4.

In this way, the incrementing wheel 88 is driven in rotation through a fraction of a turn, and by virtue of the transmission shaft 80, it causes the endless screw 72 to rotate likewise through a fraction of a turn, by way of the small 78 and large 82 wheels and of the drive belt 94 coupling them together. This transmission is ensured in spite of the relative movements of the support arm 58 and of the mounting plate 60, and on the basis of the incrementing wheel 88, during the rotation of the drive wheel 54, by virtue of the universal joints 84, 86 and of the transmission shaft 80 into sliding parts. Thus, the axes of rotation of the large wheel 82 and of the incrementing wheel 88, which are substantially parallel, are alternately moved away from and toward one another in a perpendicular direction that they define, while they remain coupled in terms of rotation.

The rotation of the endless screw 72 in turn causes the carriage 70 to be driven in translational movement and, on the basis thereof, the cutting tool 92 to be driven in translational movement with a given amplitude. This amplitude is determined by the angular increment of the incrementing wheel 88, by the transmission ratio between the small wheel 78 and the large wheel 76, and by the pitch of the endless screw 72. This amplitude is intended to be less than the width of the cutting tool 92. In this way, the entire surface of the external circular edge 46 can be machined.

Thus, by virtue of the above-described installation and the method that it implements, an end 32 of the external sealing sheath 22 having a homogeneous and substantially constant thickness e over the entire machined part, is obtained.

Thus, the difference between the maximum and minimum thicknesses of the sheath in the machined part is typically less than one tenth of a millimeter. Moreover, the surface state of the machined part of the sheath is very good. Consequently, this machining method markedly improves the quality and the ripe reliability of the sealing crimped connection of the sheath.

It will also be understood that the installation also makes it possible to machine the end of the intermediate sheath 18 or even of the pressure sheath 12 that are shown in FIG. 1.

Figure 7:
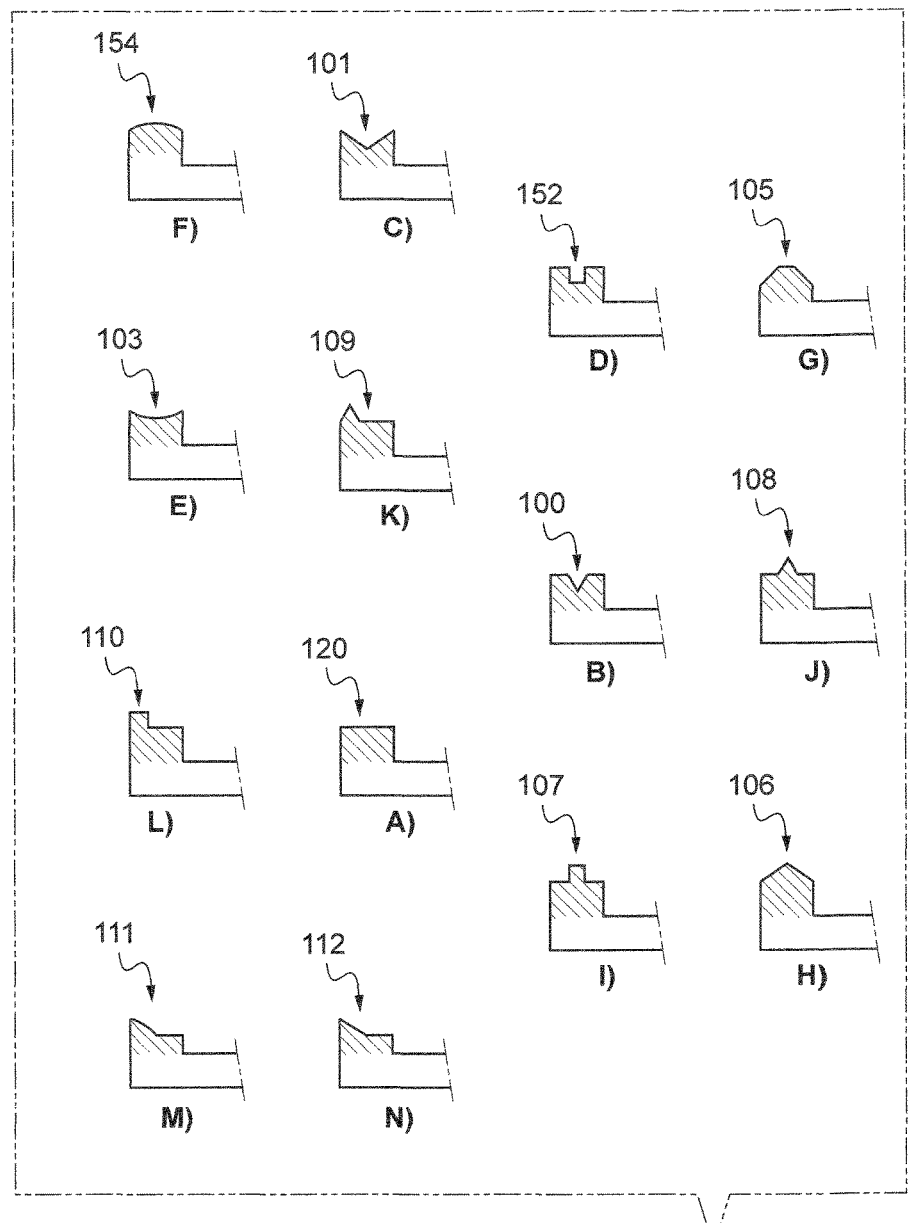
FIGS. 7A to 7N show a detail of the schematic view shown in FIG. 6, in a plurality of variant embodiments.

FIG. 7 illustrates in detail a plurality of embodiments of the collar 44' of the ring 36' as shown in FIG. 6. The invention can be implemented with a collar as shown in FIG. 7A, having a flat upper face 120, or more precisely an external surface in the form of a cylinder of revolution. The parallelism between the axis of symmetry A of the drive wheel 54 and the axis D of the ring 36' is thus adjusted precisely such that the guide roller 66 remains in contact with the collar 44' without coming out of abutment with its upper face.

Advantageously, the collar 44' and the guide roller 66 have means for limiting the possibility of axial movement of the guide roller 66 with respect to the collar 44'. These guide means can be implemented for example by forming a groove 100 in the external surface in the form of a cylinder of revolution, as shown in detail in FIG. 7B and in FIG. 6, while the guide roller 66 illustrated in FIGS. 2 and 3 is, for its part, equipped with a flange 68 that is able to pass into this groove 100.

Other groove profiles 101, 152 and 103 are shown respectively in FIGS. 7C, 7D and 7E.

It will be seen that the guide roller 66 has two degrees of freedom with respect to the drive wheel 54. Firstly, it can move in a direction parallel to the axis A on account of the fact that the support base 67 is mounted so as to slide with respect to the drive wheel 54. Secondly, it can move radially on account of the elastic means 102. Consequently, even if the axes A and D are not perfectly parallel, the flange 68 of the guide roller 66 is permanently held in the groove 100 without any risk of derailment, these two degrees of freedom allowing the guide roller 66 to move with respect to the drive wheel 54 in order to make up for this lack of parallelism.

It is also possible to reverse the roles of the guide roller 66 and of the collar 44' by forming a groove in the guide roller 66 and forming a collar flange on the collar 44'. Thus, FIGS. 7F to 7N respectively illustrate various profiles of angular or rounded collar flanges 154, 105, 106, 107, 108, 109, 110, 111, 112.

Thus, the guide roller 66 has different groove shapes, the profile of which is able to cooperate with the various collar flange profiles.

According to one embodiment of the invention, the support arm 58 is elongate such that the overall stroke of the movable carriage 70 is much greater than the length of the rings 36, 36', 36", for example such that this stroke is around 50 centimeters. In this case, it is possible to machine several sheath ends by leaving the support ring 52 in the same position with respect to the flexible pipe. This makes it possible to save time by avoiding having to move the support ring 52 between two machining operations. This solution can be advantageously used to successively machine the ends of the intermediate sheath 35 and of the external sheath 32. It will be seen, however, that the axes of the two rings 36', 36" are not necessarily parallel, such that it is not possible to position the support ring 52 in such a way that the axis of the drive wheel 54 is simultaneously parallel to the axes of the two rings 36', 36", and this can have the drawback of reducing the precision of machining one of the two sheath ends. In the present case, the support ring 52 is advantageously aligned and centered with respect to the third ring 36" so as to favor the precision of machining the end of the intermediate sheath 35.

The invention claimed is:

1. A method for mounting a securing end fitting for a flexible tubular pipe, the method comprising the following steps:
    a) providing an end fitting, and providing a ring having an external surface in the form of a cylinder of revolution and having two opposite cylindrical ends, and providing a sheath having a sheath end and an external circular edge situated at the sheath end;
    b) fitting the ring inside the sheath end and the ring is fitted with one of the two cylindrical ends which are allowed to extend out of the sheath end;
    c) leveling off an external circular edge of the sheath to form a leveled edge that has cylindrical symmetry of revolution and is substantially coaxial with the external cylindrical surface, and leveling the external circular edge off at a given radial distance from the external cylindrical surface by using the one of the two ring ends as a support; and
    d) covering the leveled edge with the end fitting so that the sheath end can be crimped between the ring and the end fitting.

2. The mounting method as claimed in claim 1, further comprising, in step c), holding a cutting tool against the external circular edge at the given radial distance from the external cylindrical surface, while driving the cutting tool in rotation about the ring.

3. The mounting method as claimed in claim 2, further comprising driving the cutting tool in translational movement in the axial direction of the ring.

4. The mounting method as claimed in claim 3, further comprising driving the cutting tool in translational movement with a given stroke amplitude for each turn of the cutting tool.

5. The mounting method as claimed in claim 1, further comprising:
    providing a ring having a guide groove on one of two of the ring ends.

6. The mounting method as claimed in claim 5, further comprising:
    providing a ring having the guide groove in the bearing collar.

7. The mounting method as claimed in claim 1, further comprising:
    providing a ring of which the one of the two ring ends has a bearing collar.

8. An installation for mounting a securing end fitting for a flexible tubular pipe, the flexible tubular pipe comprising a sheath having a sheath end and an external circular edge situated at the sheath end; and
    a ring having an external surface in the form of a cylinder of revolution and two opposite cylindrical ends, the ring being fitted inside the sheath end with one of the two cylindrical ends being allowed to extend out of the sheath end;
    a cutting tool, for the one part, and a bearing member that is configured to use the one of the ring ends as a support to hold the cutting tool against the external edge at a given radial distance from the external cylindrical surface, for the other part;
    the cutting tool configured to be driven in rotation about the ring to level off the external edge in order to form a leveled edge that has cylindrical symmetry of revolution and is substantially coaxial with the external cylindrical surface.

9. The installation as claimed in claim 8, further comprising a drive wheel having an axis of symmetry A and a peripheral edge, for the one part, and a support arm that is mounted on the peripheral edge and extends substantially parallel to the axis of symmetry A, for the other part, and the bearing member and the cutting tool are mounted on the support arm.

10. The installation as claimed in claim 9, further comprising the support arm is mounted to be able to move in translation on the drive wheel in a radial direction.

11. The installation as claimed in claim 10, further comprising elastic members for forcing the support arm toward the center of the drive wheel.

12. The installation as claimed in claim 9, further comprising the cutting tool is mounted to be able to move in translation on the support arm in a direction parallel to the axis of symmetry A.

13. The installation as claimed in claim 9, further comprising the bearing member has a roller that has an axis of rotation substantially parallel to the axis of symmetry A.

14. The installation as claimed in claim 9, further comprising a holder configured to hold the drive wheel, the holder being configured to hold the drive wheel and the flexible tubular pipe substantially coaxially.

\* \* \* \* \*